United States Patent
Xia (10) Patent No.: US 9,497,660 B2
(45) Date of Patent: Nov. 15, 2016

(54) METHOD FOR PROVIDING SERVICES, SERVICE BROKER, AND POLICY AND CHARGING RULES FUNCTION APPARATUS

(71) Applicant: Huawei Technologies Co., Ltd., Shenzhen (CN)

(72) Inventor: Xiuyan Xia, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 250 days.

(21) Appl. No.: 14/145,021

(22) Filed: Dec. 31, 2013

(65) Prior Publication Data

US 2014/0112133 A1    Apr. 24, 2014

Related U.S. Application Data

(63) Continuation of application No. PCT/CN2012/070495, filed on Jan. 17, 2012.

(30) Foreign Application Priority Data

Jul. 29, 2011 (CN) .......................... 2011 1 0215486

(51) Int. Cl.
*H04W 28/02* (2009.01)
*H04L 12/14* (2006.01)
(Continued)

(52) U.S. Cl.
CPC ...... *H04W 28/0268* (2013.01); *H04L 12/1407* (2013.01); *H04L 41/0893* (2013.01); *H04M 15/66* (2013.01)

(58) Field of Classification Search
CPC ................................................ H04W 28/0268
See application file for complete search history.

(56) References Cited

U.S. PATENT DOCUMENTS 7,856,025 B2 * 12/2010 He .......................... H04L 12/56
370/396
8,184,533 B2 * 5/2012 Jin .......................... H04L 47/10
370/230

(Continued)

FOREIGN PATENT DOCUMENTS

CN    101540980 A    9/2009
CN    101610240 A    12/2009
(Continued)

OTHER PUBLICATIONS

"All-IP System—MMD Policy Enhancements", 3GPP2 X S0053-0, Jun. 2008, pp. 10-12; 31, Version 1.0, 3rd Generation Partnership Project 2.

(Continued)

*Primary Examiner* — Rasheed Gidado
(74) *Attorney, Agent, or Firm* — Staas & Halsey LLP (57) ABSTRACT

Embodiments of the present invention disclose a method for providing a service, a service broker, and a policy and charging rules function apparatus. The method includes: receiving a service request; determining, according to the service request, at least one AF associated with the service; determining QoS requirement information of each AF; sending a QoS authorization request to a PCRF, where the QoS authorization request carries the QoS requirement information of each AF; receiving an authorization success answer sent by the PCRF so as to provide the service through the at least one AF, where the authorization success answer carries authorization to the QoS requirement information of each AF. According to the method and the apparatus in the embodiments of the present invention, QoS requests are controlled by using an SB in centralized mode so that the development and operation costs can be reduced.

13 Claims, 6 Drawing Sheets

400

Receive a quality of service QoS authorization request sent by a service broker SB, where the QoS authorization request carries QoS requirement information of each AF in at least one application function apparatus AF associated with a service — S410

Send an authorization success answer to the SB so that the SB provides the service through the at least one AF, where the authorization success answer carries authorization to the QoS requirement information of each AF — S420

(51) Int. Cl.
*H04L 12/24* (2006.01)
*H04M 15/00* (2006.01)

(56) References Cited

U.S. PATENT DOCUMENTS

| | | | | |
|---|---|---|---|---|
| 8,316,457 | B1* | 11/2012 | Paczkowski | H04L 67/306 726/27 |
| 8,498,651 | B2* | 7/2013 | Livanos | H04W 28/16 370/254 |
| 8,725,881 | B2* | 5/2014 | Pastor Balbas | H04L 12/5695 709/227 |
| 2006/0265499 | A1* | 11/2006 | Menasce | G06Q 10/06 709/225 |
| 2008/0271113 | A1* | 10/2008 | Belling | H04L 63/20 726/1 |
| 2009/0182883 | A1* | 7/2009 | Giaretta | G06Q 40/00 709/228 |
| 2009/0228956 | A1* | 9/2009 | He | H04L 63/20 726/1 |
| 2010/0287599 | A1* | 11/2010 | He | H04L 12/14 726/1 |
| 2011/0317558 | A1* | 12/2011 | Siddam | H04W 28/16 370/235 |
| 2012/0042059 | A1 | 2/2012 | Tian et al. | 709/223 |
| 2012/0290452 | A1* | 11/2012 | Pancorbo Marcos | H04L 12/1407 705/30 |
| 2013/0066940 | A1* | 3/2013 | Shao | H04L 67/1025 709/201 |

FOREIGN PATENT DOCUMENTS

| | | |
|---|---|---|
| CN | 102223240 A | 10/2011 |
| WO | 2010/145717 A1 | 12/2010 |

OTHER PUBLICATIONS

"3rd Generation Partnership Project; Technical Specification Group Services and System Aspects; Study on Architecture Impacts of Service Brokering (Release 8)", 3GPP TR 23.810 V8.0.0 (Sep. 2008) Technical Report, 2008, pp. 1-26, 3GPP Organizational Partners, Valbonne, France.

International Search Report issued May 3, 2012, in corresponding International Patent Application No. PCT/CN2012/070495.

Chinese Office Action issued Feb. 26, 2013, in corresponding Chinese Patent Application No. 201110215486.7.

"3rd Generation Partnership Project; Technical Specification Group Core Network and Terminals; Policy and Charging Control signalling flows and Quality of Service (QoS) parameter mapping (Release 12)", 3GPP TS 29.213 V12.3.0 (Mar. 2014) Technical Specification, 2014, pp. 1-204, 3GPP Organizational Partners, Valbonne, France.

"3rd Generation Partnership Project; Technical Specification Group Core Network and Terminals; Policy and Charging Control (PCC); Reference points (Release 12)", 3GPP TS 29.212 V12.4.0 (Mar. 2014) Technical Specification, 2014, pp. 1-220, 3GPP Organizational Partners, Valbonne, France.

"3G, 3rd Generation Partnership Project 2 (3GPP2)", cover page only.

* cited by examiner

| Receive a quality of service QoS authorization request sent by a service broker SB, where the QoS authorization request carries QoS requirement information of each AF in at least one application function apparatus AF associated with a service | S410 |

↓

| Send an authorization success answer to the SB so that the SB provides the service through the at least one AF, where the authorization success answer carries authorization to the QoS requirement information of each AF | S420 |

METHOD FOR PROVIDING SERVICES, SERVICE BROKER, AND POLICY AND CHARGING RULES FUNCTION APPARATUS

CROSS-REFERENCE TO RELATED APPLICATIONS

This application is a continuation of International Application No. PCT/CN2012/070495, filed on Jan. 17, 2012, which claims priority to Chinese Patent Application No. 201110215486.7, filed on Jul. 29, 2011, both of which are hereby incorporated by reference in their entireties.

TECHNICAL FIELD

Embodiments of the present invention relate to the communications field, and in particular, to a method for providing a service, a service broker, and a policy and charging rules function apparatus in the communications field.

BACKGROUND

An Internet Protocol (Internet Protocol, "IP" for short) multimedia subsystem (IP Multimedia Subsystem, "IMS" for short) is a main landmark stage for a communication core network to implement all-IP evolution. Currently, with convergence between a fixed network and a mobile network of each carrier and combination between an information technology (Information Technology, "IT" for short) and a communication technology (Communication Technology, "CT" for short), the IMS has stepped into a period for implementation and commercial use, and each domestic carrier has also begun a test of the IMS and its intelligent services.

As a communications network evolves towards the IP, a requirement for developing a communications service lowers and subsequently, a service management problem needs to be faced. In the IMS architecture, initial filter criteria (Initial Filter Criteria, "IFC" for short) may be used to control the triggering of each service, thereby implementing separation between a service and its control. In addition, the IFC can be compiled into a very flexible extensible markup language (Extensible Markup Language, "XML" for short) script to determine the triggering of each service. However, this still results in a service conflict. Therefore, a 3rd Generation Partnership Project puts forward a concept of a service broker (Service Broker, "SB" for short) to resolve the problem of the service conflict.

As a next generation broadband network develops towards the IP, various services, including a voice service, run on an IP network, and therefore a problem of quality of service (Quality of Service, "QoS for short) arises in providing a service. A huge difference exists between requirements of users, and quality requirements on a same service are also different. That is, a user may sign different service level agreements (Service Level Agreement, "SLA" for short) according to an actual requirement of the user and selects a proper charging mode. Therefore, the QoS becomes an essential element involved in each charging layer. When the QoS changes, it is required that a corresponding charging mode can be selected promptly, thereby implementing a real dynamic and accurate charging. In addition, to keep a leading position in a value chain and avoid being channelized, a carrier may identify a service flow and content through content perception and an in-depth packet detection technology, so that various services on a network can be perceived and a corresponding charging mode is provided, thereby meeting different requirements of different service providers.

To implement threshold control, QoS control, and charging control at a service data flow level, the 3GPP Release 7 formulates a specification related to a structure of a policy and charging control (Policy and Charging Control, "PCC" for short) system based on flow based charging (Flow Based Charging, "FBC" for short) in the Release 6. The PCC system combines a policy control function (that is, a service based local policy (Service Based Local Policy, "SBLP" for short)) and a flow based charging function (that is, FBC) which are in the R6 version and integrates a function of a related interface.

On the PCC system, an application function apparatus (Application Function, "AF" for short) and a policy and charging rules function apparatus (Policy and Charging Rules Function, "PCRF" for short) connect with each other through an Rx interface to control the QoS. Therefore, the AF focuses too much on details that are not related to a function. QoS requirements among different AFs may be different. That is, some may be associated with others, and some may even conflict with others. Therefore, how to effectively control and manage the QoS is a technical problem that needs to be currently resolved.

SUMMARY

Embodiments of the present invention provide a method for providing a service, a service broker, and a policy and charging rules function apparatus. QoS requests are controlled by using an SB in centralized mode so that QoS can be effectively controlled and managed.

According to one aspect, an embodiment of the present invention provides a method for providing a service, including: receiving a service request used to make a request for providing a service; determining, according to the service request, at least one application function apparatus AF associated with the service; determining quality of service QoS requirement information of each AF in the at least one AF; sending a QoS authorization request to a policy and charging rules function apparatus PCRF, where the QoS authorization request carries the QoS requirement information of each AF; and receiving an authorization success answer sent by the PCRF so as to provide the service through the at least one AF, where the authorization success answer carries authorization to the QoS requirement information of each AF.

According to another aspect, an embodiment of the present invention provides a method for providing a service, including: receiving a quality of service QoS authorization request sent by a service broker SB, where the QoS authorization request carries QoS requirement information of each AF in at least one application function apparatus AF associated with a service; and sending an authorization success answer to the SB so that the SB provides the service through the at least one AF, where the authorization success answer carries authorization to the QoS requirement information of each AF.

According to still another aspect, an embodiment of the present invention provides a service broker, including: a first receiving module, configured to receive a service request used to make a request for providing a service; a first determining module, configured to determine, according to the service request, at least one application function apparatus AF associated with the service; a second determining module, configured to determine quality of service QoS requirement information of each AF in the at least one AF; a sending module, configured to send a QoS authorization request to a policy and charging rules function apparatus PCRF, where the QoS authorization request carries the QoS requirement information of each AF; and a second receiving module, configured to receive an authorization success answer sent by the PCRF so as to provide the service through the at least one AF, where the authorization success answer carries authorization to the QoS requirement information of each AF.

According to yet another aspect, an embodiment of the present invention provides a policy and charging rules function apparatus, including: a receiving module, configured to receive a quality of service QoS authorization request sent by a service broker SB, where the QoS authorization request carries QoS requirement information of each AF in at least one application function apparatus AF associated with a service; and a sending module, configured to send an authorization success answer to the SB so that the SB provides the service through the at least one AF, where the authorization success answer carries authorization to the QoS requirement information of each AF.

Based on the technical solutions, according to the method for providing a service, the service broker, and the policy and charging rules function apparatus in the embodiments of the present invention, the SB determines QoS requirement information of each AF in at least one AF associated with the service that needs to be provided, and sends the QoS requirement information to the PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It should be understood that the technical solutions of the present invention may be applied to various communications systems such as a global system of mobile communication (Global System of Mobile communication, "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short) system, a long term evolution (Long Term Evolution, "LTE" for short) system, an LTE frequency division duplex (Frequency Division Duplex, "FDD" for short) system, an LTE time division duplex (Time Division Duplex, "TDD" for short) system, and a universal mobile telecommunication system (Universal Mobile Telecommunication System, "UMTS" for short).

Figure 1:
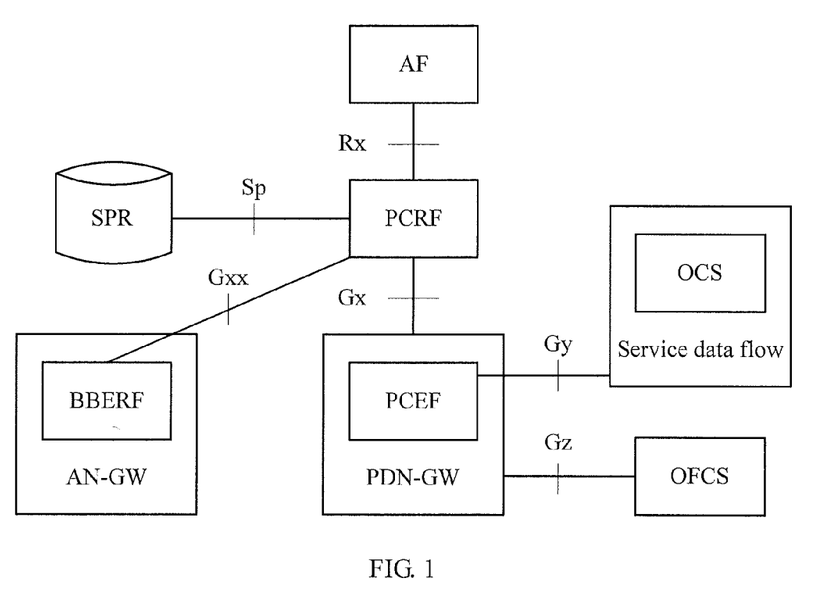
FIG. 1 is a schematic structural diagram of a policy and charging control system according to a related technology.

It should be understood that in a PCC system shown in FIG. 1, a PCRF is connected to an AF, a subscription profile repository (Subscription Profile Repository, "SPR" for short), a bearer binding and event reporting function (Bearer Binding and Event Reporting Function, "BBERF" for short), and a policy and charging enforcement function (Policy and Charging Enforcement Function, "PCEF" for short) through an Rx interface, an Sp interface, a Gxx interface, and a Gx interface respectively. The BBERF may be located in an access network gateway (Access Network Gateway, "AN-GW" for short), and the PCEF may be located in a public data network gateway (Public Data Network Gateway, "PDN-GW" for short). The PCEF is connected to an online charging system (Online Charging System, "OCS" for short) and an offline charging system (Offline Charging System, "OFCS" for short) through a Gy interface and a Gz interface respectively.

The AF is a functional entity that provides applications, and these applications are required to perform dynamic policy and charging control for a user plane and provide dynamic application session information for the PCRF. The PCRF includes policy control decision and flow based charging control functions. The PCRF performs service data flow based detection, gating control and QoS authorization, and network control based on flow based charging, for the PCEF. The PCRF checks whether service information provided by the AF is consistent with a policy rule predefined by a carrier and subscriber subscription information obtained from the SPR, generates a corresponding rule according to the service information, and delivers the corresponding rule to the PCEF. The PCRF further needs to perform QoS authorization for the service information provided by the AF.

The PCEF has policy execution and flow based charging functions. The PCEF is located in the PDN gateway. That is, the PCEF is located in a gateway GPRS support node (Gateway GPRS Support Node, "GGSN" for short) in GPRS, and is located in a private data generator (Private Data Generator, "PDG" for short) in a wireless local area network (Wireless Local Area Network, "WLAN" for short). The PCEF controls user plane traffic and QoS, provides service data flow detection and measurement, and interacts with the online and offline charging systems. The PCEF specifically executes information, such as QoS and gating control that are defined for a service data flow, in a PCC rule, and reports a change of a related service data flow to the PCRF.

Introduction of the PCC system ensures that both policy and charging-related content can be included in a PCC operation. This provides a carrier with a policy control and charging system with stronger real-time performance. Converged policy control and charging operations can be combined and completed in a same process, thereby significantly reducing the amount of signaling that needs to be transmitted in a system and improving delay performance of the system. In addition, information interaction between policy control information and charging information is provided, so that the carrier is capable of performing charging according to QoS and policy control.

Figure 2:
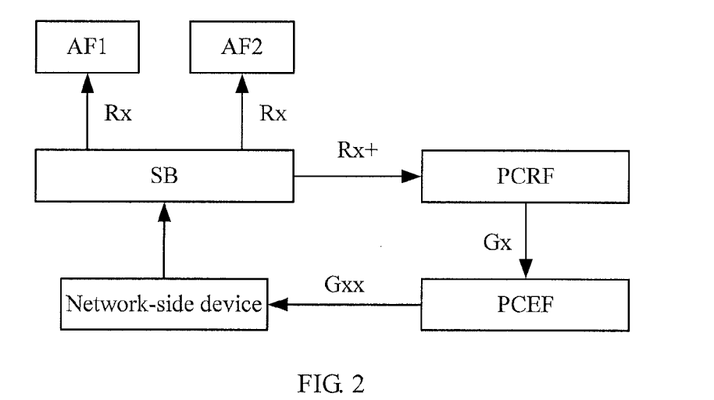
FIG. 2 is a schematic diagram of an application scenario of a method according to an embodiment of the present invention.

FIG. 2 is a schematic diagram of an application scenario of a method according to an embodiment of the present invention. As shown in FIG. 2, at least one AF is connected to an SB through an Rx interface, the SB is connected to a PCRF through an Rx+ interface and connected to a network-side device, the PCRF is connected to a PCEF through a Gx interface, and the PCEF is connected to the network-side device through a Gxx interface. It should be understood that in FIG. 2, two AFs are taken as an example for description; however, this embodiment of the present invention is not limited thereto. For example, the number of AFs may be determined according to a specific service. It should further be understood that in this embodiment of the present invention, an AF and an SB may be connected through an Rx interface, or may also be connected through an internal non-standard interface, where the internal non-standard interface has a function similar to that of the Rx interface. This embodiment of the present invention is merely described through the example where the AF and the SB are connected through the Rx interface; however, the present invention is not limited thereto.

Figure 3:
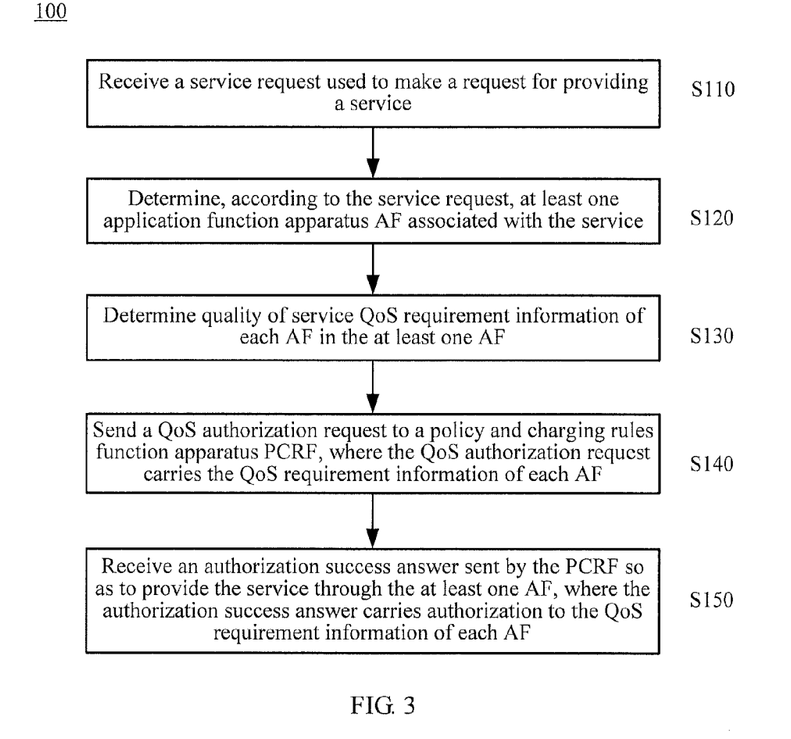
FIG. 3 is a schematic flowchart of a method for providing a service according to an embodiment of the present invention.

FIG. 3 is a schematic flowchart of a method 100 for providing a service according to an embodiment of the present invention. As shown in FIG. 3, the method 100 includes:

S110. Receive a service request used to make a request for providing a service.

S120. Determine, according to the service request, at least one application function apparatus AF associated with the service.

S130. Determine quality of service QoS requirement information of each AF in the at least one AF.

S140. Send a QoS authorization request to a policy and charging rules function apparatus PCRF, where the QoS authorization request carries the QoS requirement information of each AF.

S150. Receive an authorization success answer sent by the PCRF so as to provide the service through the at least one AF, where the authorization success answer carries authorization to the QoS requirement information of each AF.

After receiving a service request sent by a network-side device or the like, a service broker SB may determine, according to the service request, at least one AF associated with a service that is requested to be provided, and determine QoS requirement information of each AF in the at least one AF. After that, the SB may send a QoS authorization request to a PCRF, where the QoS authorization request carries the QoS requirement information of each AF, and receive an authorization success answer sent by the PCRF so as to provide the service through the at least one AF, where the authorization success answer carries authorization to the QoS requirement information of each AF that is sent by the PCRF.

Therefore, according to the method for providing a service in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

In S110, the SB receives a service request for triggering a service. Generally, the service request is sent by a network or a network-side device and is used to request the SB to provide a service.

In S120, the SB may determine an associated AF according to the service that needs to be provided, and the associated AF and the number of AFs may be determined according to the service that needs to be provided.

In S130, the SB needs to determine the QoS requirement information of each AF associated with the service. In this embodiment of the present invention, optionally, the SB determines, according to preset first QoS requirement information of a first AF in the at least one AF, QoS requirement information of the first AF. That is, for at least a part of AFs, their corresponding QoS requirement information is pre-stored in the SB. It should be understood that the first AF may be one or more AFs in the at least one AF, and may further be all AFs in the at least one AF.

For example, when accessing a network, each AF submits its own QoS requirement information to a carrier, and the SB may store the QoS requirement information inside a system as preset QoS requirement information. Specifically, for example, an AF fixedly requires a bandwidth of 128K, which does not need to be dynamically adjusted. In this case, the AF may allow an SB to fixedly apply for a bandwidth of 128K for the AF.

Figure 4:
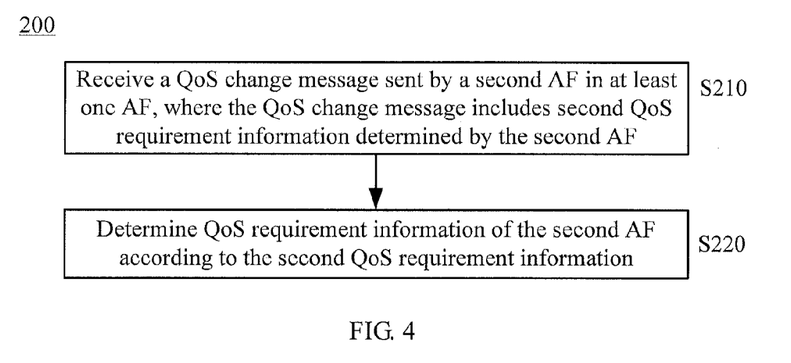
FIG. 4 is a schematic flowchart of a method for determining QoS requirement information of an AF according to an embodiment of the present invention.

In this embodiment of the present invention, optionally, as shown in FIG. 4, the method 100 for providing a service further includes:

S210. The SB receives a QoS change message sent by a second AF in the at least one AF, where the QoS change message includes second QoS requirement information determined by the second AF.

The determining, by the SB, QoS requirement information of each AF in the at least one AF may include:

S220. The SB determines QoS requirement information of the second AF according to the second QoS requirement information.

Similarly, it should be understood that the second AF may be one or more AFs in the at least one AF, and may further be all AFs in the at least one AF. It should be noted that in this embodiment of the present invention, a method 200 for determining QoS requirement information of an AF may include S210 and S220, and S130 may include the method 200.

In a specific implementation process, after receiving the service request used to request for providing a service, the SB may notify each AF associated with the service that is requested to be provided to prepare for providing the service. After a notification is received from the SB, an AF sends the above QoS change message to the SB if the AF determines that QoS needs to be changed.

In this embodiment of the present invention, before the SB determines QoS requirement information of an AF, the SB may receive a QoS change message sent by a second AF in the at least one AF. The determining, by the SB, QoS requirement information of each AF in the at least one AF may include: determining, by the SB, QoS requirement information of the second AF according to second QoS requirement information carried in the QoS change message. After that, the SB may send the determined QoS requirement information of each AF in the at least one AF to a PCRF in unified mode.

In this embodiment of the present invention, after the SB sends the QoS requirement information of each AF to the PCRF in unified mode, the SB may further receive a QoS change message sent by a second AF in the at least one AF and determine QoS requirement information of the second AF. After that, the SB may independently send the QoS requirement information of the second AF to the PCRF to change a QoS requirement.

It should be understood that in this embodiment of the present invention, the SB may further specifically determine the QoS requirement information of each AF according to a QoS control policy. For example, the SB determines the final QoS requirement information of each AF according to preset first QoS requirement information of a first AF, or second QoS requirement information that is sent by a second AF through a QoS change message, and based on a QoS control policy associated with a service or AF performance, or the like. For example, an AF is only capable of applying for a bandwidth of 128 k-512 k. However, the AF applies for a bandwidth of 1M in a session process. In this case, the SB may only allow that a maximum upper limit of the bandwidth requested by the AF is 512 k. For another example, for QoS requirement information of different AFs, the SB may simply sum up QoS required by each AF, or may further take maximum QoS.

In S140, optionally, the sending, by the SB, a QoS authorization request to a PCRF includes: sending, by the SB, an authentication authorization request AAR message to the PCRF, where the AAR message includes the QoS requirement information of each AF.

In S150, optionally, the receiving, by the SB, an authorization success answer sent by the PCRF includes: receiving, by the SB, an authentication authorization answer AAA message that is sent by the PCRF according to the AAR message, where the AAA message includes the authorization to the QoS requirement information of each AF.

In this embodiment of the present invention, the AAR message includes at least one first attribute value pair (Attribute Value Pair, "AVP" for short) group, such as an [RxPlus-Information] AVP group, and each first AVP group in the at least one first AVP group bears QoS requirement information of one AF in the at least one AF. Table 1 lists a specific example of the AAR message according to this embodiment of the present invention.

TABLE 1

| AVP Name | AVP Code | Example |
|---|---|---|
| <Session-Id> | 263 | host1.com;1876543210;523 |
| Auth-Application-Id | 4 | |
| {Origin-Host} | 264 | relay01.intermms.sfr.fr |
| {Origin-Realm} | 296 | intermms.sfr.fr |
| {Destination-Realm} | 283 | www.huawei.com |
| *[Subscription-Id] | 443 | — |
|   {Subscription-Id-Type} | 450 | 0: Indicates that the terminal identity is of the international E.164 format that is defined according to the ITU-TE.164 number scheme. |
|   {Subscription-Id-Data} | 444 | 33611280968 |
| [RxPlus-Information] | 20999 | — |
|   [AF-Application-Identifier] | 504 | AF1 |
|   [AF-Charging-Identifier] | 505 | AF1-1888375843 |
|   [Media-Component-Description] | 517 | — |
|     {Media-Component-Number} | 518 | m= |
|     [Media-Type] | 520 | m= |
|     [Max-Requested-Bandwidth-UL] | 515 | 256k |
|     [Max-Requested-Bandwidth-DL] | 516 | 256k |
| [RxPlus-Information] | 20999 | — |
|   [AF-Application-Identifier] | 504 | AF2 |
|   [AF-Charging-Identifier] | 505 | AF2-2348789684 |
|   [Media-Component-Description] | 517 | |
|     {Media-Component-Number} | 518 | m= |
|     [Media-Type] | 520 | m= |
|     [Max-Requested-Bandwidth-UL] | 515 | 256k |
|     [Max-Requested-Bandwidth-DL] | 516 | 256k |

In this embodiment of the present invention, the AAR message includes the QoS requirement information of each AF in at least one AF associated with the service; and the AAA message includes the authorization to the QoS requirement information of each AF, where the QoS requirement information is mainly reported bandwidth information, total bandwidth for uplink and downlink, uplink bandwidth and downlink bandwidth of a media component, or the like. The following describes a specific example of the AAA message according to this embodiment of the present invention.

```
<AA-Answer> ::= < Diameter Header: 265, PXY >
    < Session-Id >
    { Auth-Application-Id }
    { Origin-Host }
    { Origin-Realm }
    [ Result-Code ]
    [ Experimental-Result ]
    *[ Access-Network-Charging-Identifier ]
    [ Access-Network-Charging-Address ]
        [ Acceptable-Service-Info ]
            *[ Media-Component-Description ]
                { Media-Component-Number}//// media component
identifier in an AF
                *[ Media-Sub-Component ] //// media sub-component
identifier in an AF
                    AF-Application-Identifier ] //// AF application identifier
                    [ Media-Type ] //// The most commonly used media type is
Aduio/Video
                    [ Max-Requested-Bandwidth-UL ] ////uplink bandwidth
                    [ Max-Requested-Bandwidth-DL ] ////downlink bandwidth
                    [ Flow-Status ]
                    [ Reservation-priority ]
                    [RS-Bandwidth] ////bandwidth of an RTCP sending port
                    [RR-Bandwidth] ////bandwidth of an RTCP receiving port
                    *[ Codec-Data ]
            [ Max-Requested-Bandwidth-DL ] ////total downlink bandwidth
            [ Max-Requested-Bandwidth-UL ] ////total uplink bandwidth
    *[ AVP ]
```

In this embodiment of the present invention, the SB and the PCRF interacts with each other through an Rx+ interface. The Rx+ interface is an extension to an Rx interface, which supports simultaneous control to QoS of multiple AFs. The SB and the PCRF need to support an extended Rx+ protocol, and the following provides a specific example for describing an extension of the Rx+ protocol.

```
<AA-Request> ::= < Diameter Header: 265, REQ, PXY >
    < Session-Id >
    { Auth-Application-Id }
    { Origin-Host }
    { Origin-Realm }
    { Destination-Realm }
    [ Destination-Host ]
*[ Subscription-ID ]
    *[ RxPlus-Information ]
        [ AF-Application-Identifier ]
        *[ Media-Component-Description ]
    { Media-Component-Number } ; Ordinal number of the media comp.
            *[ Media-Sub-Component ]; Set of flows for one flow
            identifier
            [ Media-Type ]
            [ Max-Requested-Bandwidth-UL ]
            [ Max-Requested-Bandwidth-DL ]
            [ Flow-Status ]
            [ Reservation-priority ]
            [ RS-Bandwidth ]
            [ RR-Bandwidth ]
            *[ Codec-Data ]
        [Service-Info-Status ]
        [ AF-Charging-Identifier ]
        [ SIP-Forking-Indication ]
        *[ Specific-Action ]
*[ Supported-Features ]
    [ Reservation-Priority ]
    [ Framed-IP -Address ]
    [ Framed-IPv6-Prefix ]
    [ Called-Station-ID ]
    [ Service-URN ]
    [Origin-State-Id ]
```

According to the method for providing a service in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

Figure 5:
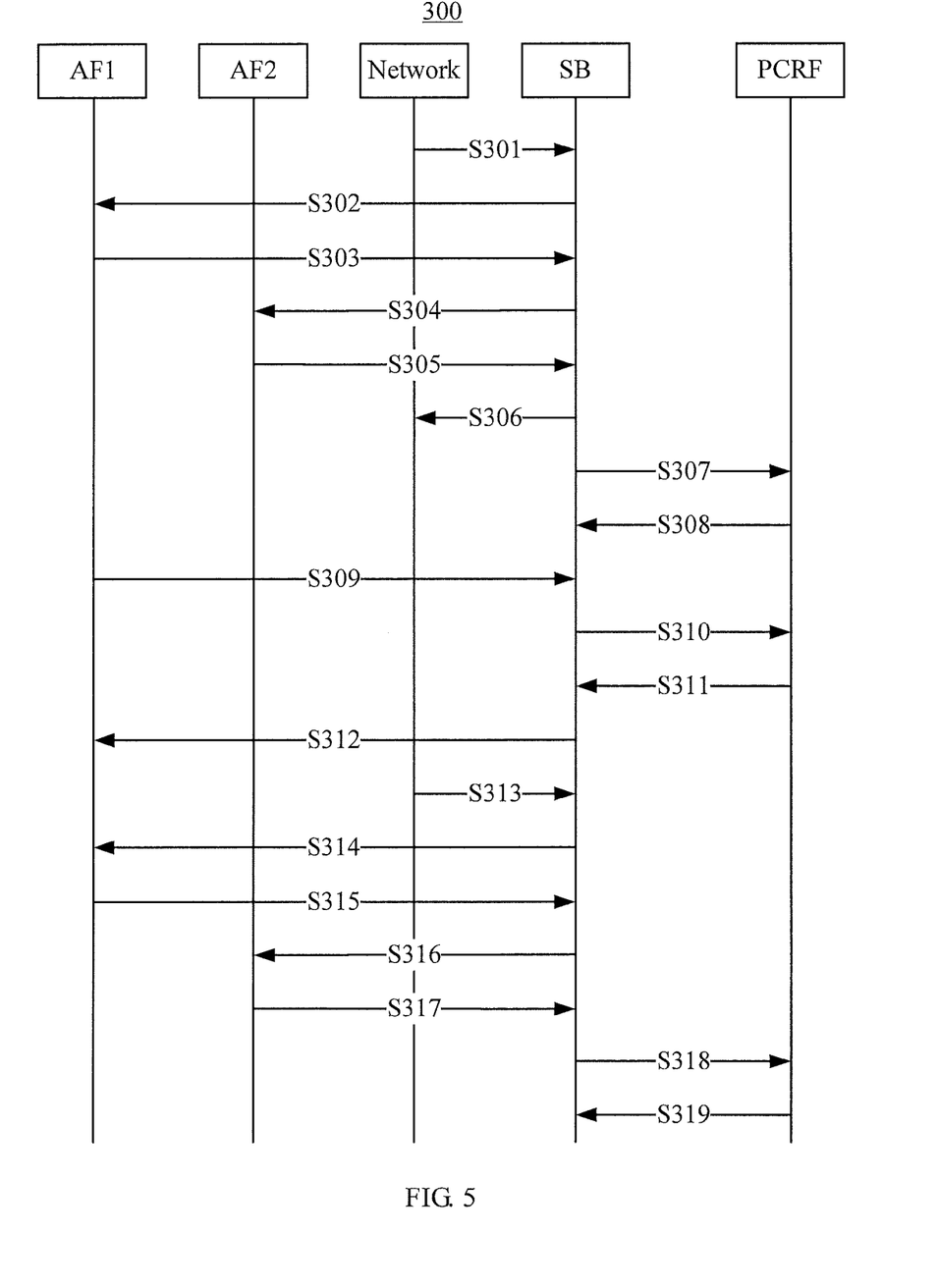
FIG. 5 is another schematic flowchart of a method for providing a service according to an embodiment of the present invention.

With reference to a method 300 shown in FIG. 5, the following describes the method for providing a service according to an embodiment of the present invention in detail. As shown in FIG. 5, the method 300 includes:

S301. Trigger (Trigger) a service request from a network side to a service broker Service Broker (SB).

S302. The Service Broker decides, according to a service triggering rule, to preferentially trigger an AF1 and sends the service request (Service Request) to the AF1.

S303. The AF1 returns a service response (Service Response) to the Service Broker.

S304. The Service Broker decides, according to a service permutation and combination rule, to continue to trigger an AF2 and sends the Service Request to the AF2.

S305. The AF2 returns a Service Response to the Service Broker.

S306. The Service Broker returns a Trigger response to the network side.

S307. The Service Broker carries, according to preset QoS requests of the AF1 and the AF2, multiple pieces of AF session information in an AAR request to a PCRF to set up an AF session. It should be understood that if an AF needs to change a preset QoS request, for example, different users need to provide different QoS, the AF may further send the session to the Service Broker through, for example, a service response when a session is set up, and the Service Broker summarizes the multiple pieces of AF session information and sends the session information to the PCRF in unified mode to set up the AF session.

Extension description is as follows: The Service Broker carries multiple [RxPlus-Information] AVP groups in an AAR message, and each group carries QoS request information of an AF.

S308. The PCRF receives the AAR request and returns an AAA.

S313. The network side initiates a session end request to the Service Broker.

S314. The Service Broker initiates a service end request to the AF1.

S315. The AF1 returns a service end response.

S316. The Service Broker initiates a service end request to the AF2.

S317. The AF2 returns a service end response.

S318. The Service Broker initiates an STR to the PCRF to end the session.

S319. The PCRF returns an STA to the Service Broker.

In this embodiment of the present invention, if an AF needs to change QoS during a session, the AF may send a QoS changing (QoS Changing) request to the Service Broker, and the AF and the Service Broker may interact with each other through an Rx interface or an internal protocol interface. In this case, the method 300 may include S309 to S312, and specifically, S309. The AF1 sends the QoS Changing request to the Service Broker, where the request carries changed QoS requirement information.

S310. The Service Broker initiates an AAR request to the PCRF, where the AAR request includes the changed QoS requirement information. In this case, the Service Broker may use an Rx+ interface to send the AAR request to the PCRF, where the AAR request carries [Rxplus-Information]. For example, the AF1 needs to adjust an uplink bandwidth requirement of the QoS to 512K during the session. In this case, the AF1 may send an AAR request that carries a changed QoS parameter Max-Requested-Bandwidth-UL of 512K to the Service Broker.

S311. The PCRF returns an AAA response to the Service Broker.

S312. The Service Broker returns a QoS Changing response (AAA) to the AF1.

It should be understood that the sequence numbers of the above steps do not imply an execution sequence. The execution sequence of the steps should be determined according to functions and internal logic of the steps, which is not intended to limit the implementation process in this embodiment of the present invention in any way.

According to the method for providing a service in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

Figure 6:
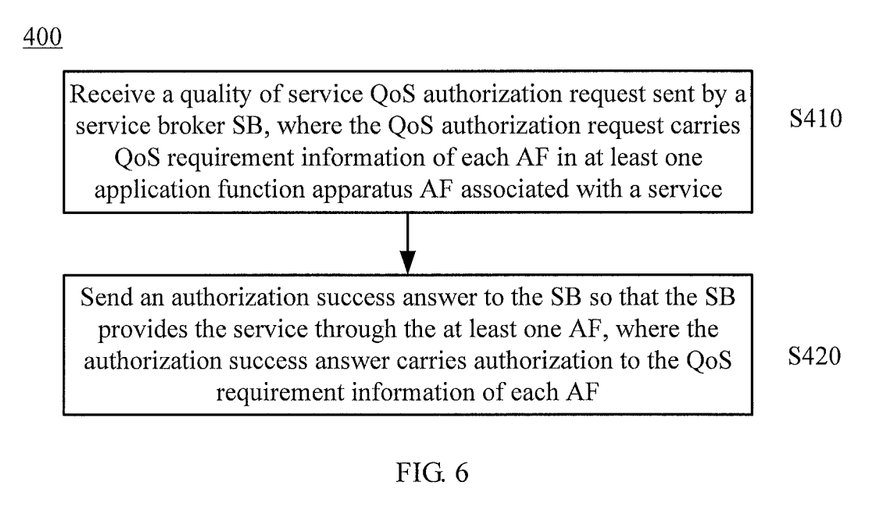
FIG. 6 is a schematic flowchart of a method for providing a service according to another embodiment of the present invention.
Figure 7:
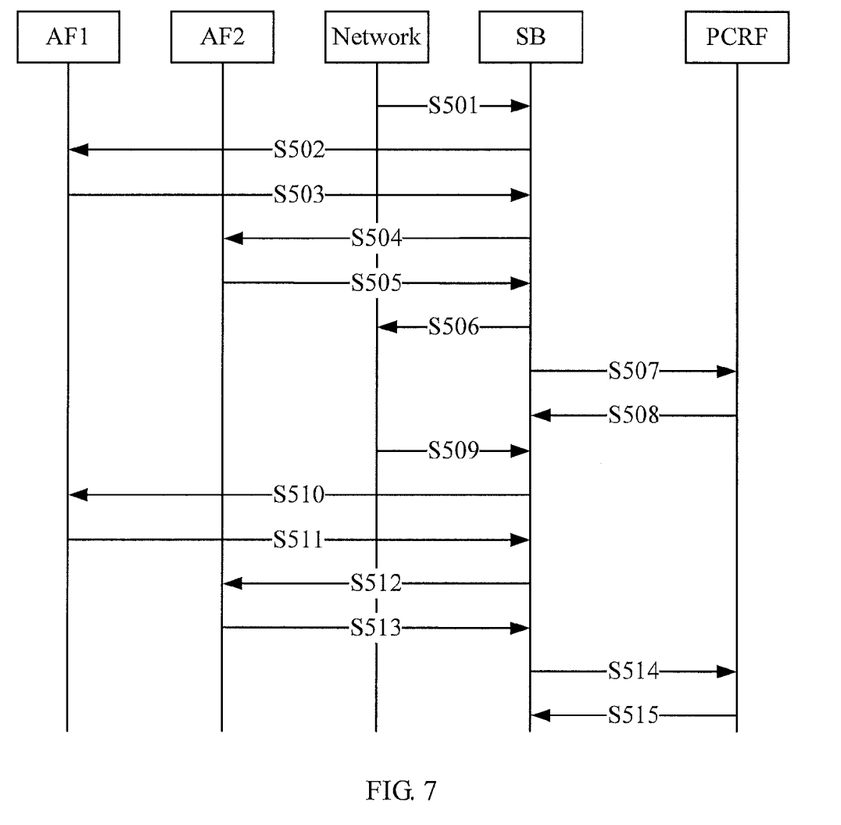
FIG. 7 is still another schematic flowchart of a method for providing a service according to an embodiment of the present invention.

With reference to FIG. 1 to FIG. 5, the foregoing describes the methods for providing a service according to the embodiments of the present invention from the standpoint of a service broker SB in detail. With reference to FIG. 6 and FIG. 7, the following describes the methods from the standpoint of a policy and charging rules function apparatus PCRF.

As shown in FIG. 6, a method 400 for providing a service according to an embodiment of the present invention includes:

S410. Receive a quality of service QoS authorization request sent by a service broker SB, where the QoS authorization request carries QoS requirement information of each AF in at least one application function apparatus AF associated with a service.

S420. Send an authorization success answer to the SB so that the SB provides the service through the at least one AF, where the authorization success answer carries authorization to the QoS requirement information of each AF.

In S410, the receiving, by a PCRF, a QoS authorization request sent by an SB may include: receiving, by the PCRF, an authentication authorization request AAR message sent by the SB, where the AAR message includes the QoS requirement information of each AF in the at least one AF.

In S420, the sending, by the PCRF, an authorization success answer to the SB may include: sending, by the PCRF, an authentication authorization answer AAA message to the SB, where the AAA message includes the authorization to the QoS requirement information of each AF.

According to the method for providing a service in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

In an embodiment of the present invention, an interaction protocol between an SB and an AF includes but is not limited to protocols such as the Customized Applications for Mobile Network Enhanced Logic (Customized Applications for Mobile Network Enhanced Logic, "CAMEL" for short) Application Part (CAMEL Application Part, "CAP" for short), a Session Initiation Protocol (Session Initiation Protocol, "SIP" for short), and an Intelligent Network Application Protocol (Intelligent Network Application Protocol, "INAP" for short). With reference to FIG. 7, the following takes that the SIP protocol is used between an AFI and a Service Broker and that the CAP protocol is used between an AF2 and the Service Broker as examples to describe the method in this embodiment of the present invention.

As shown in FIG. 7, in S501, a service request is triggered to the Service Broker; in S502, the Service Broker decides, according to a service triggering rule, to preferentially trigger the AF1 and sends an INVITE (INVITE) message to the AF1; in S503, the AF1 returns 200 OK to the Service Broker; in S504, the Service Broker decides, according to a service alignment combination rule, to continue to trigger the AF2 and sends an initial detection point (Initial Detection Point, "IDP" for short) message to the AF2; in S505, the AF2 returns a Continue (Continue) message to the Service Broker; in S506, the Service Broker returns a Trigger (Trigger) response to a network side; in S507, the Service Broker carries multiple pieces of AF session information in an AAR request to a PCRF according to a preset QoS request of the AF1 and that of the AF2 and sets up an AF session; if an AF needs to change a preset QoS request, the AF may also send an Rx request to the Service Broker during session setup, and after summarizing the multiple pieces of AF session information, the Service Broker sends the session information to the PCRF in unified mode and sets up the AF session; in S508, the PCRF receives the AAR request and returns an AAA; in S509, the network side initiates a session end request to the Service Broker; in S510, the Service Broker initiates a service end request Bye to the AF1; in S511, the AF1 returns a service end response 200 OK; in S512, the Service Broker reports a call event ERB (oDisconnect) to the AF2; in S513, the AF2 returns a release call (Release Call, "RC" for short); in S514, the Service Broker initiates a session termination request (Session Termination Request, "STR" for short) to the PCRF to end a session; and in S515, the PCRF returns a session termination answer (Session Termination Answer, "STA" for short) to the Service Broker.

It should be understood that in this embodiment of the present invention, the AF may send a QoS Changing request to the Service Broker so as to change QoS. For a specific operation, reference may be made to the method 300 shown in FIG. 5. For brevity, details are not repeated herein. It should further be understood that the sequence numbers of the above steps do not imply an execution sequence. The execution sequence of the steps should be determined according to functions and internal logic of the steps, which is not intended to limit the implementation process in this embodiment of the present invention in any way.

According to the method for providing a service in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

Figure 8:
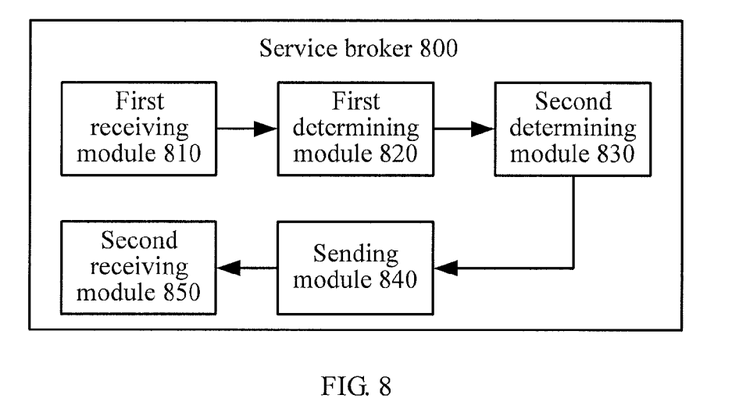
FIG. 8 is a schematic block diagram of a service broker according to an embodiment of the present invention.
Figure 9:
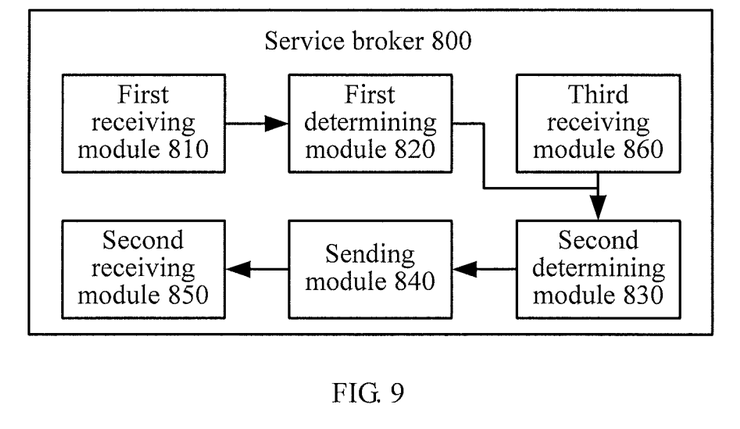
FIG. 9 is a schematic block diagram of a service broker according to another embodiment of the present invention.
Figure 10:
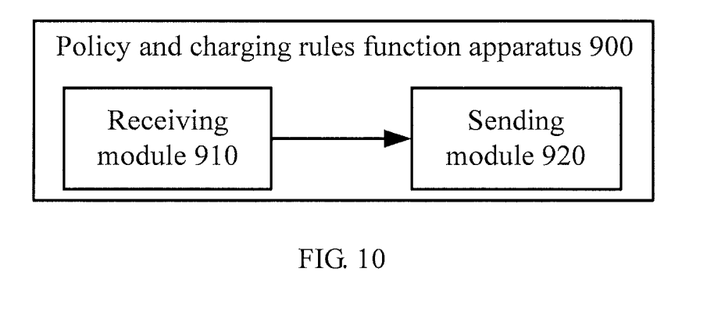
FIG. 10 is a schematic block diagram of a policy and charging rules function apparatus according to an embodiment of the present invention.

With reference to FIG. 1 to FIG. 7, the foregoing describes the methods for providing a service according to the embodiments of the present invention in detail. With reference to FIG. 8 to FIG. 10, the following describes a service broker SB and a policy and charging rules function apparatus PCRF according to embodiments of the present invention in detail.

FIG. 8 is a schematic block diagram of a service broker 800 according to an embodiment of the present invention. As shown in FIG. 8, the service broker 800 includes:

a first receiving module 810, configured to receive a service request used to make a request for providing a service;

a first determining module 820, configured to determine, according to the service request, at least one application function apparatus AF associated with the service;

a second determining module 830, configured to determine quality of service QoS requirement information of each AF in the at least one AF;

a sending module 840, configured to send a QoS authorization request to a policy and charging rules function apparatus PCRF, where the QoS authorization request carries the QoS requirement information of each AF; and a second receiving module 850, configured to receive an authorization success answer sent by the PCRF so as to provide the service through the at least one AF, where the authorization success answer carries authorization to the QoS requirement information of each AF.

According to the service broker in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

In this embodiment of the present invention, optionally, the second determining module 830 is further configured to determine, according to preset first QoS requirement information of a first AF in the at least one AF, QoS requirement information of the first AF.

In this embodiment of the present invention, optionally, as shown in FIG. 9, the service broker 800 further includes:

a third receiving module 860, configured to receive a QoS change message sent by a second AF in the at least one AF, where the QoS change message includes second QoS requirement information determined by the second AF.

The second determining module 830 is further configured to determine QoS requirement information of the second AF according to the second QoS requirement information.

In this embodiment of the present invention, optionally, the sending module 840 is further configured to send an authentication authorization request AAR message to the PCRF, where the AAR message includes the QoS requirement information of each AF. The second receiving module 850 is further configured to receive an authentication authorization answer AAA message that is sent by the PCRF according to the AAR message, where the AAA message includes the authorization to the QoS requirement information of each AF.

Optionally, the AAR message includes at least one first attribute value pair AVP group, and each first AVP group in the at least one first AVP group bears QoS requirement information of one AF in the at least one AF.

The service broker 800 according to this embodiment of the present invention may correspond to a Service Broker (SB) in this embodiment of the present invention, and the foregoing and other operations and/or functions of each of the modules in the service broker 800 are intended for implementing the corresponding processes of each of the methods in FIG. 1 to FIG. 7 respectively. For brevity, details are not repeated herein.

According to the service broker in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

FIG. 10 is a schematic block diagram of a policy and charging rules function apparatus 900 according to an embodiment of the present invention. As shown in FIG. 10, the policy and charging rules function apparatus 900 includes:

a receiving module 910, configured to receive a quality of service QoS authorization request sent by a service broker SB, where the QoS authorization request carries QoS requirement information of each AF in at least one application function apparatus AF associated with a service; and a sending module 920, configured to send an authorization success answer to the SB so that the SB provides the service through the at least one AF, where the authorization success answer carries authorization to the QoS requirement information of each AF.

Optionally, the receiving module 910 is further configured to receive an authentication authorization request AAR message sent by the SB, where the AAR message includes the QoS requirement information of each AF in the at least one AF, and the sending module 920 is further configured to send an authentication authorization answer AAA message to the SB, where the AAA message includes the authorization to the QoS requirement information of each AF.

Optionally, the AAR message includes at least one first attribute value pair AVP group, and each first AVP group in the at least one first AVP group bears QoS requirement information of one AF in the at least one AF.

The policy and charging rules function apparatus 900 according to this embodiment of the present invention may correspond to a PCRF in this embodiment of the present invention, and the foregoing and other operations and/or functions of each of the modules in the policy and charging rules function apparatus 900 are intended for implementing the corresponding processes of each of the methods in FIG. 1 to FIG. 7 respectively. For brevity, details are not repeated herein.

According to the policy and charging rules function apparatus in this embodiment of the present invention, an SB determines QoS requirement information of each AF in at least one AF associated with a service that needs to be provided, and sends the QoS requirement information to a PCRF in unified mode. In this way, QoS can be effectively controlled in centralized mode, the amount of signaling that needs to be transmitted in a system is reduced, delay performance of the system is improved, a development cost of the AF can be reduced, provisioning of a service is accelerated, and the operation and maintenance costs are reduced.

Persons of ordinary skill in the art should understand that, in combination with the embodiments herein, steps of the method or algorithm described may be directly implemented using hardware, a software module executed by a processor, or the combination thereof. In order to clearly describe the interchangeability between the hardware and the software, compositions and steps of each example have been generally described according to functions in the foregoing descriptions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections are implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into a processing unit, or each of the units may exist alone physically, or two or more units may be integrated into a unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of software product. The computer software product is stored in a storage medium and includes several instructions for instructing a computer device (which may be a personal computer, a server, a network device) to perform all or a part of steps of the method described in the embodiments of the present invention. The storage medium includes: any medium that can store program code, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any equivalent modification or replacement that may be easily figured out by persons skilled in the art within the technical scope of the present invention shall fall within the protection scope of the present invention. Therefore, the protection scope of the present invention shall be subject to the protection scope of the claims.

What is claimed is:

1. A method for providing a service, comprising:
   receiving, by a service broker, a service request used to make a request for providing a service;
   determining, by a processor of the service broker, according to the service request, at least one application function apparatus AF associated with the service;
   determining, by the service broker, quality of service QoS requirement information of each AF in the at least one AF, such that QoS is controlled in a centralized mode and an amount of signaling transmitted by the at least one AF is reduced;
   sending, from the service broker, a QoS authorization request to a policy and charging rules function apparatus PCRF, wherein the QoS authorization request carries the QoS requirement information of each AF; and
   receiving, by the service broker, an authorization success answer sent by the PCRF to provide the service through the at least one AF, wherein the authorization success answer carries authorization to the QoS requirement information of each AF.

2. The method according to claim 1, wherein the determining QoS requirement information of each AF in the at least one AF comprises:
   determining, according to preset first QoS requirement information of a first AF in the at least one AF, QoS requirement information of the first AF.

3. The method according to claim 1, further comprising:
receiving a QoS change message sent by a second AF in the at least one AF, wherein the QoS change message comprises second QoS requirement information determined by the second AF; and
the determining QoS requirement information of each AF in the at least one AF comprises:
determining QoS requirement information of the second AF according to the second QoS requirement information.

4. The method according to claim 1 wherein the sending a QoS authorization request to a PCRF comprises:
sending an authentication authorization request AAR message to the PCRF, wherein the AAR message comprises the QoS requirement information of each AF; and
the receiving an authorization success answer sent by the PCRF comprises:
receiving an authentication authorization answer AAA message that is sent by the PCRF according to the AAR message, wherein the AAA message comprises authorization to the QoS requirement information of each AF.

5. A method for providing a service, comprising:
receiving, by a policy and charging rules function apparatus PCRF including a processor, a quality of service QoS authorization request sent by a service broker SB, wherein the QoS authorization request carries QoS requirement information of each AF in at least one application function apparatus AF associated with a service, such that QoS is controlled in a centralized mode and an amount of signaling transmitted by the at least one AF is reduced; and
sending, by the PCRF, an authorization success answer to the SB so that the SB provides the service through the at least one AF, wherein the authorization success answer carries authorization to the QoS requirement information of each AF.

6. The method according to claim 5, wherein the receiving a QoS authorization request sent by an SB comprises:
receiving an authentication authorization request AAR message sent by the SB, wherein the AAR message comprises the QoS requirement information of each AF in the at least one AF; and
the sending an authorization success answer to the SB comprises:
sending an authentication authorization answer AAA message to the SB, wherein the AAA message comprises authorization to the QoS requirement information of each AF.

7. A service broker, comprising:
at least one processor including:
a first receiving module, configured to receive a service request used to make a request for providing a service;
a first determining module, configured to determine, according to the service request, at least one application function apparatus AF associated with the service;
a second determining module, configured to determine quality of service QoS requirement information of each AF in the at least one AF;
a sending module, configured to send a QoS authorization request to a policy and charging rules function apparatus PCRF, wherein the QoS authorization request carries the QoS requirement information of each AF; and
a second receiving module, configured to receive an authorization success answer sent by the PCRF so as to provide the service through the at least one AF, wherein the authorization success answer carries authorization to the QoS requirement information of each AF, such that QoS is controlled in a centralized mode and an amount of signaling transmitted by the at least one AF is reduced.

8. The service broker according to claim 7, wherein the second determining module is specifically configured to determine, according to preset first QoS requirement information of a first AF in the at least one AF, QoS requirement information of the first AF.

9. The service broker according to claim 7, further comprising:
a third receiving module, configured to receive a QoS change message sent by a second AF in the at least one AF, wherein the QoS change message comprises second QoS requirement information determined by the second AF; and
the second determining module is specifically configured to determine QoS requirement information of the second AF according to the second QoS requirement information.

10. The service broker according to claim 7, wherein the sending module is specifically configured to send an authentication authorization request AAR message to the PCRF, the AAR message comprises the QoS requirement information of each AF, the second receiving module is specifically configured to receive an authentication authorization answer AAA message that is sent by the PCRF according to the AAR message, and the AAA message comprises authorization to the QoS requirement information of each AF.

11. A policy and charging rules function apparatus, comprising:
at least one processor including:
a receiving module, configured to receive a quality of service QoS authorization request sent by a service broker SB, wherein the QoS authorization request carries QoS requirement information of each AF in at least one application function apparatus AF associated with a service, such that QoS is controlled in a centralized mode and an amount of signaling transmitted by the at least one AF is reduced; and
a sending module, configured to send an authorization success answer to the SB so that the SB provides the service through the at least one AF, wherein the authorization success answer carries authorization to the QoS requirement information of each AF.

12. The policy and charging rules function apparatus according to claim 11, wherein the receiving module is specifically configured to receive an authentication authorization request AAR message sent by the SB, the AAR message comprises the QoS requirement information of each AF in the at least one AF, the sending module is specifically configured to send an authentication authorization answer AAA message to the SB, and the AAA message comprises authorization to the QoS requirement information of each AF.

13. A system comprising:
a service broker; and
a policy and charging rules function apparatus, wherein:
the policy and charging rules function apparatus includes at least one processor configured to receive a quality of service QoS authorization request sent by the service broker SB, wherein the QoS authorization request carries QoS requirement information of each AF in at least one application function apparatus AF associated with a service, and to send an authorization success answer to the SB so that the SB provides the service through the at least one AF, wherein the authorization success answer carries authorization to the QoS requirement information of each AF; and the service broker includes at least one processor configured to receive a service request used to make a request for providing a service, to determine, according to the service request, at least one application function apparatus AF associated with the service, to determine quality of service QoS requirement information of each AF in the at least one AF, to send a QoS authorization request to the policy and charging rules function apparatus PCRF, wherein the QoS authorization request carries the QoS requirement information of each AF, and to receive an authorization success answer sent by the PCRF so as to provide the service through the at least one AF, wherein the authorization success answer carries authorization to the QoS requirement information of each AF, such that QoS is controlled in a centralized mode and an amount of signaling transmitted by the at least one AF is reduced.

\* \* \* \* \*